(12) United States Patent  (10) Patent No.: US 7,815,352 B2
Naganawa et al.  (45) Date of Patent:  Oct. 19, 2010

| (54) | VEHICULAR HEADLAMP | | |
|---|---|---|---|
| (75) | Inventors: | Masahito Naganawa, Shizuoka (JP); Michio Tsukamoto, Shizuoka (JP) | |
| (73) | Assignee: | Koito Manufacturing Co., Ltd., Tokyo (JP) | |
| ( * ) | Notice: | Subject to any disclaimer, the term of this patent is extended or adjusted under 35 U.S.C. 154(b) by 252 days. | |
| (21) | Appl. No.: | 12/127,305 | |
| (22) | Filed: | May 27, 2008 | |
| (65) | | Prior Publication Data | |
| | US 2008/0298077 A1 | Dec. 4, 2008 | |
| (30) | | Foreign Application Priority Data | |
| May 30, 2007 | (JP) | ............................. 2007-142962 | |
| (51) | Int. Cl. *B60Q 1/08* (2006.01) | | |
| (52) | U.S. Cl. ...................... 362/523; 362/539; 362/465; 362/466 | | |
| (58) | Field of Classification Search ................. 362/465, 362/468, 530, 523, 418, 507, 512, 524, 538 See application file for complete search history. | | |
| (56) | | References Cited | |

U.S. PATENT DOCUMENTS

| 5,584,560 | A  * | 12/1996  | Gosswiller et al. ........... 362/524 |
|---|---|---|---|
| 6,254,259 | B1 * | 7/2001 | Kobayashi ................... 362/465 |
| 6,848,814 | B2 | 2/2005 | Watanabe et al. |
| 7,153,007 | B2 * | 12/2006 | Fukawa et al. ............... 362/465 |
| 7,175,319 | B2 * | 2/2007 | Tajima et al. ................ 362/465 |
| 7,195,378 | B2 * | 3/2007 | Fukawa et al. ............... 362/465 |
| 7,210,828 | B2 * | 5/2007 | Fukawa et al. ............... 362/465 |
| 7,234,849 | B2 * | 6/2007 | Hori et al. .................... 362/466 |
| 7,364,331 | B2 * | 4/2008 | Tajima ........................ 362/509 |
| 7,690,825 | B2 * | 4/2010 | Kuwahara et al. ............ 362/530 |
| 2004/0085780 | A1 * | 5/2004 | Hayami ....................... 362/523 |
| 2005/0018437 | A1 * | 1/2005 | Hori et al. .................... 362/465 |
| 2008/0025036 | A1 * | 1/2008 | Takada et al. ................ 362/523 |

* cited by examiner

*Primary Examiner*—Anabel M Ton
(74) *Attorney, Agent, or Firm*—Osha Liang LLP

(57)  ABSTRACT

A vehicular headlamp includes a light source for illuminating light from the vehicular headlamp in an illumination direction; a swivel mechanism capable of changing the illumination direction horizontally rightward and leftward; a leveling mechanism capable of changing the illumination direction vertically upward and downward; and electronic control unit capable of controlling the swivel mechanism and the leveling mechanism so as to change the illumination direction toward an oncoming vehicle lane side during linear travel of a vehicle. A method of illumination control for a vehicular headlamp includes illuminating light from the vehicular headlamp in an illumination direction; and changing the illumination direction toward an oncoming vehicle lane side during linear travel of a vehicle.

14 Claims, 8 Drawing Sheets

VEHICULAR HEADLAMP

BACKGROUND OF INVENTION

1. Field of the Invention

The present invention relates to a headlamp of a vehicle such as an automobile, and more specifically relates to a vehicular headlamp that increases an illumination effect in front of a traveling host vehicle to help ensure driving safety.

2. Related Art

In order to increase the safety of a traveling host vehicle, it is necessary to brightly illuminate a travel route of the host vehicle (hereinafter also referred to as a host vehicle lane) and improve the visibility of the host vehicle lane. Especially during high speed driving, visibility in the host vehicle lane up to a certain distant area ahead must be increased. In such cases, the illumination from a high-beam distribution pattern, which is capable of illumination over a long distance and has a laterally wide illumination range, is preferred over the illumination from a low-beam distribution pattern. However, a high-beam distribution pattern is prone to dazzling oncoming and preceding vehicles. For this reason, during ordinary driving, illumination must be performed using a low-beam distribution pattern. Thus, ensuring sufficient visibility of the host vehicle lane becomes an issue.

Art has been proposed for increasing the visibility of the host vehicle lane, wherein an illumination direction (illumination optical axis) of a headlamp is controlled so as to deflect rightward, leftward, upward, and downward. According to Patent Document 1, deflecting the illumination direction of the headlamp rightward and leftward so as to follow a steering angle of the automobile increases visibility ahead in the host vehicle lane on a curved road. Also, according to Patent Document 1, deflecting the illumination direction of the headlamp upward when the host vehicle is driving at high speed illuminates a long distance in front of the host vehicle and increases the visibility of the host vehicle lane, even if the low-beam distribution pattern is still used.

[Patent Document 1] U.S. Pat. No. 6,848,814

SUMMARY OF INVENTION

According to the art of Patent Document 1, while the host vehicle is traveling straight, the illumination direction of the headlamp with respect to the right and left directions is fixed in the direction of advancement. Therefore, the low-beam distribution pattern is still used during high-speed driving so that oncoming vehicles are not dazzled. However, when the illumination direction is deflected upward, the rearview mirror of the preceding vehicle is illuminated and there is a risk of dazzling the preceding vehicle. The low-beam distribution pattern is set in a direction that deflects a maximum light intensity area toward a side opposite the oncoming vehicle lane with respect to the host vehicle lane, i.e., toward a road shoulder side. Therefore, even if the illumination direction is deflected upward, it is impossible to correct for the maximum light intensity area being in a direction that deviates from the host vehicle lane. As a consequence, the illumination of the host vehicle lane is not always sufficient. Accordingly, the driver may switch to the high-beam distribution pattern by manual operation when there are no oncoming vehicles, but this operation is tiresome. In cases where there are no oncoming cars and only a preceding vehicle is present, driving using the high-beam distribution pattern requires caution due to the risk of dazzling the preceding vehicle. Therefore, the illumination of the host vehicle lane where the host vehicle is traveling becomes insufficient and results in inadequate visibility of the host vehicle lane, which is not desirable in terms of driving safety.

One or more embodiments of the present invention provide a vehicular headlamp that improves visibility of a host vehicle lane on which a host vehicle travels while driving straight, and helps ensure the driving safety of the host vehicle. One or more embodiments of the present invention provide a method of illumination control for a vehicular headlamp comprising illuminating light from the vehicular headlamp in an illumination direction; and changing the illumination direction toward an oncoming vehicle lane side during linear travel of a vehicle.

One or more embodiments of the present invention involve a vehicular headlamp capable of illumination according to a light distribution pattern that does not dazzle an oncoming vehicle and capable of changing an illumination direction, the vehicular headlamp characterized by comprising illumination direction control means for orienting and deflecting the illumination direction toward an oncoming vehicle lane side during linear travel of a vehicle. More specifically, oncoming vehicle detection means capable of detecting an oncoming vehicle is provided, and the illumination direction control means performs a deflection control when the oncoming vehicle detection means does not detect an oncoming vehicle.

According to one or more embodiments of the present invention, if there is no oncoming vehicle, an illumination direction is deflected toward an oncoming vehicle side. Thus, a maximum light intensity area normally oriented more toward a road shoulder side than a host vehicle lane, i.e., toward a side opposite the oncoming vehicle line, can be oriented toward a linear travel direction of the host vehicle lane. Accordingly the host vehicle lane is brightly illuminated and visibility improved.

Other aspects and advantages of the invention will be apparent from the following description, the drawings and the claims.

DETAILED DESCRIPTION

According to embodiments of the present invention, preceding vehicle detection means capable of detecting a preceding vehicle is provided, and an illumination direction is controlled so as to deflect upward when the preceding vehicle detection means does not detect a preceding vehicle. If there are no oncoming vehicles, and furthermore, there are no preceding vehicles, then a maximum light intensity area can be oriented in a distant forward direction of a host vehicle lane. This results in improved visibility of a distant forward area of the host vehicle lane, and more particularly, improved visibility of the host vehicle lane during high-speed driving.

Illumination direction control means is capable of performing a control that, using an illumination direction during linear travel as a reference, deflects the illumination direction rightward and leftward so as to follow a steering angle of the vehicle. At times when there are no oncoming vehicles and times when there are no oncoming or preceding vehicles, the illumination direction control means sets the illumination direction controlled to deflect toward the oncoming vehicle side or upward as the reference for linear travel. Visibility in a steering direction and a linear direction of the host vehicle lane is thus improved when driving at high speed on a curved road, in addition to being improved on a straight road.

First Embodiment

Figure 1:
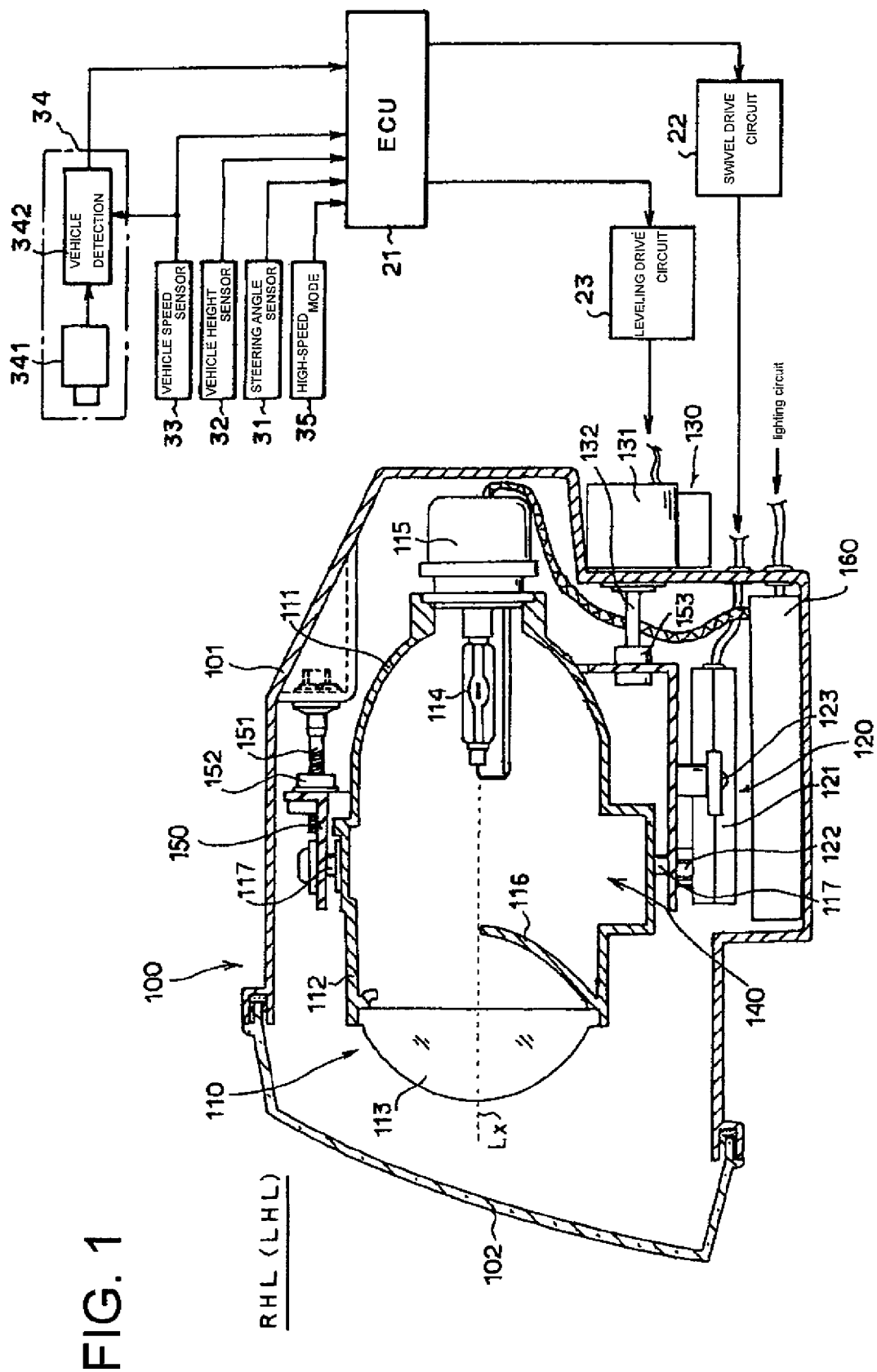
FIG. 1 is a view showing an overall structure of a headlamp according to a first embodiment.

A first embodiment of the present invention will be described with reference to the accompanying drawings. FIG. 1 is a cross-sectional view of the first embodiment, which can be applied to a right or left headlamp HL of an automobile. Right and left headlamps basically have the same structure, and a right-side headlamp RHL is shown here. In the headlamp RHL, a lamp housing 100 is structured from a container-like lamp body 101 whose front surface is open, and a translucent cover 102 through which light can pass that is attached to the front surface opening of the lamp body 101. A projector type lamp unit 110 is installed within the lamp housing 100 in order to radiate a low-beam light distribution. Also installed within the lamp housing 100 is a lamp unit in order to radiate a high-beam light distribution, which is not shown or described here. The lamp unit 110 is structured such that an optical axis (hereinafter referred to as a lamp unit optical axis) Lx of the lamp unit, i.e., an illumination direction, can be controlled by a swivel mechanism 120 and a leveling mechanism 130 so as to deflect horizontally rightward and leftward and vertically upward and downward, respectively.

The lamp unit 110 includes a reflector 111 shaped as a rotational ellipsoid, a cylindrical holder 112 connected with a front edge portion of the reflector 111, and a collecting type lens 113 fixed to a front edge portion of the holder 112. A discharge bulb 114 serving as a light source is attached by a socket 115 mounted in a bulb installation hole that is provided in a back surface of the reflector 111. Also, a shade 116 that blocks a portion of light emitted from the discharge bulb 114 is installed within the holder 112. In the lamp unit 110, light emitted from the discharge bulb 114 is collected by the reflector 111 in proximity to a position of a rear-side focal point of the lens 113. A portion of light blocked by the shade 116 is collected by the lens 113, after which such light passes through the translucent cover 102 of the lamp housing 100 and is radiated forward of the automobile. It should be noted that a ballast device 160, which is a lighting circuit for discharging and lighting the discharge bulb 114, is shown in FIG. 1, and is disposed in an inner bottom portion of the lamp housing 100.

Figure 2:
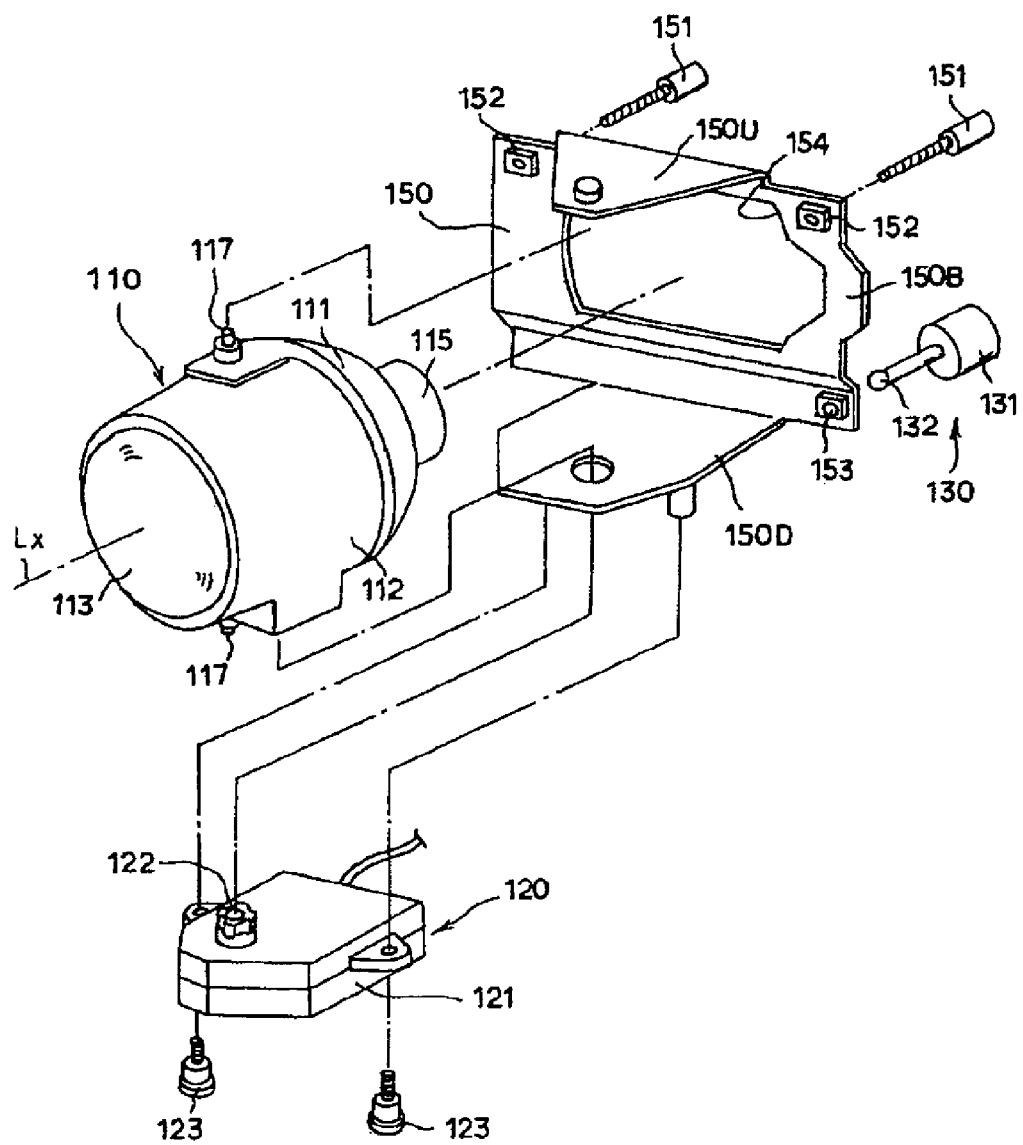
FIG. 2 is an exploded perspective view showing a schematic structure of the headlamp according to the first embodiment.

FIG. 2 is an exploded perspective view of an essential portion of the headlamp RHL. The lamp unit 110 is supported by a frame 150 bent so as to achieve a general C shape. More specifically, the lamp unit 110 is provided sandwiched on top and bottom by an upper plate 150U and a lower plate 150D of the frame 150 through an opening 154 provided in a back plate 150B of the frame 150. In such a state, the lamp unit 110 is supported rotatably in the horizontal direction by a rotation support shaft 117 provided on an upper portion and a lower portion of the holder 112. The lamp unit 110 can thus pivot around the rotation support shafts 117 in the horizontal night and left directions due to the swivel mechanism 120. The swivel mechanism 120 has an actuator 121 that serves as a rotation driving source, and the actuator 121 is fixed to a lower surface of the lower plate 150D of the frame 150 by a fixing screw 123. A rotation output shaft 122 projects from an upper surface of the actuator 121, and the rotation output shaft 122 is connected with the rotation support shaft 117 on a lower side of the lamp unit 110. The actuator 121 has a motor (not shown), a speed change mechanism that changes a speed of rotation output from the motor, and the like built in, and the rotation of the motor rotates the rotation output shaft 122. When an electric current to the actuator 121 is controlled, the rotation output shaft 122 causes the lamp unit 110 and the rotation support shaft 117 to swing in a required angular range, whereby the optical axis Lx of the lamp unit 110 is controlled so as to horizontally deflect and tilt rightward or leftward, i.e., subjected to a swivel control.

In addition, the frame 150 is supported on the lamp body 101 by aiming screws 151 that are threaded with aiming nuts 152 respectively disposed in two locations at right and left upper corners of the back plate 150B. The leveling mechanism 130 is connected with a spherical bearing 153 disposed on a portion of a lower corner of the back plate 150B. The leveling mechanism 130 has a leveling motor 131 that includes a connecting rod 132 retractable in a front-back direction of the lamp unit 110. The leveling motor 131 is fixed to an outer side surface of the lamp body 101, and a tip end portion of the connecting rod 132 is fitted with the spherical bearing 153 of the frame 150. When the leveling motor 131 is driven, the connecting rod 132 advances or retracts in an axial direction, whereby the frame 150 connected with the connecting rod 132 swings in the vertical direction with the two upper-corner aiming screws 151 acting as a fulcrum. Accordingly, the lamp unit optical axis Lx of the lamp unit 110 disposed within the frame 150 is tilted upward or downward to perform a leveling control. It should be noted that a torsional adjustment made by manually operating the two aiming screws 151 respectively moves two upper-corner locations of the frame 150 separately in the front-back direction, and adjusts a tilt in the horizontal right or left directions and a tilt in the vertical direction of the frame 150. Such an adjustment by the aiming screws 151 is used to adjust the optical axis of the lamp unit 110 so as to be oriented in a predetermined up-down direction with respect to a predetermined attitude of the automobile.

As FIG. 1 shows, the actuator 121 is connected with a swivel drive circuit 22, and the leveling motor 131 is connected with a leveling drive circuit 23. The swivel drive circuit 22 and the leveling drive circuit 23 are connected to an electronic control unit ("ECU") 21 and controlled by the ECU 21. The ECU 21 is connected to the following: a steering angle sensor 31 that detects a steering angle of the host vehicle; a vehicle height sensor 32 wherein a front portion of the host vehicle has a close relation to a tilt angle with respect to the up-down direction; a vehicle speed sensor 33 that detects a vehicle speed of the host vehicle; and a vehicle detection device 34 that detects an oncoming vehicle and a preceding vehicle present in front of the host vehicle. Based on a steering angle signal, a vehicle height signal, a vehicle speed signal, and a vehicle detection signal from the respective sensors, the ECU 21 controls the swivel drive circuit 22 and the leveling drive circuit 23 so as to control the horizontal, up and down directions of the optical axis Lx of the lamp unit 110. In the first embodiment, to set an appropriate light distribution for the host vehicle during high speed driving, a high-speed driving mode switch to be manually operated by the driver is also connected to the vehicle detection device 34 in order to control the swivel drive circuit 22 and the leveling drive circuit 23 to a preset state.

The vehicle detection device 34 is structured from a small imaging instrument 341 that has an imaging device such as a CCD, for example, and a vehicle detection portion 342 that analyzes an image taken by the imaging instrument 341 and detects an oncoming vehicle and a preceding vehicle. The imaging instrument 341 is disposed in an upper portion of a windshield of the host vehicle, for example, and picks up images in front of the host vehicle to obtain a color image. The vehicle detection portion 342 detects a point-like object with high luminance from a near-black image taken of a forward area of the host vehicle during nighttime driving, and further recognizes whether the color of the detected object is a red-based color (red, orange) or a white-based color (white, blue-white). At the same time, a speed at which a position of the detected object changes (movement speed) on an image screen is detected. These detection results and the vehicle speed of the host vehicle obtained from the vehicle speed sensor 33 at that time are comprehensively considered and it is determined that an object with a red-based color detected within an image is a tail lamp of a preceding vehicle if the movement speed on the image screen is slower than the vehicle speed of the host vehicle. Meanwhile, it is determined that a detected object with a white-based color is a headlamp of an oncoming vehicle if the movement speed on the image screen is faster than the vehicle speed of the host vehicle. Incidentally, if the movement speed of an object with a red-based color on the image screen, or the movement speed of an object with a white-based color on the image screen, is almost equal to the vehicle speed of the host vehicle, then it is determined that these are objects such as street lights or billboard lights. Thus, a preceding vehicle and an oncoming vehicle present in front of the host vehicle can be detected.

Figure 3:
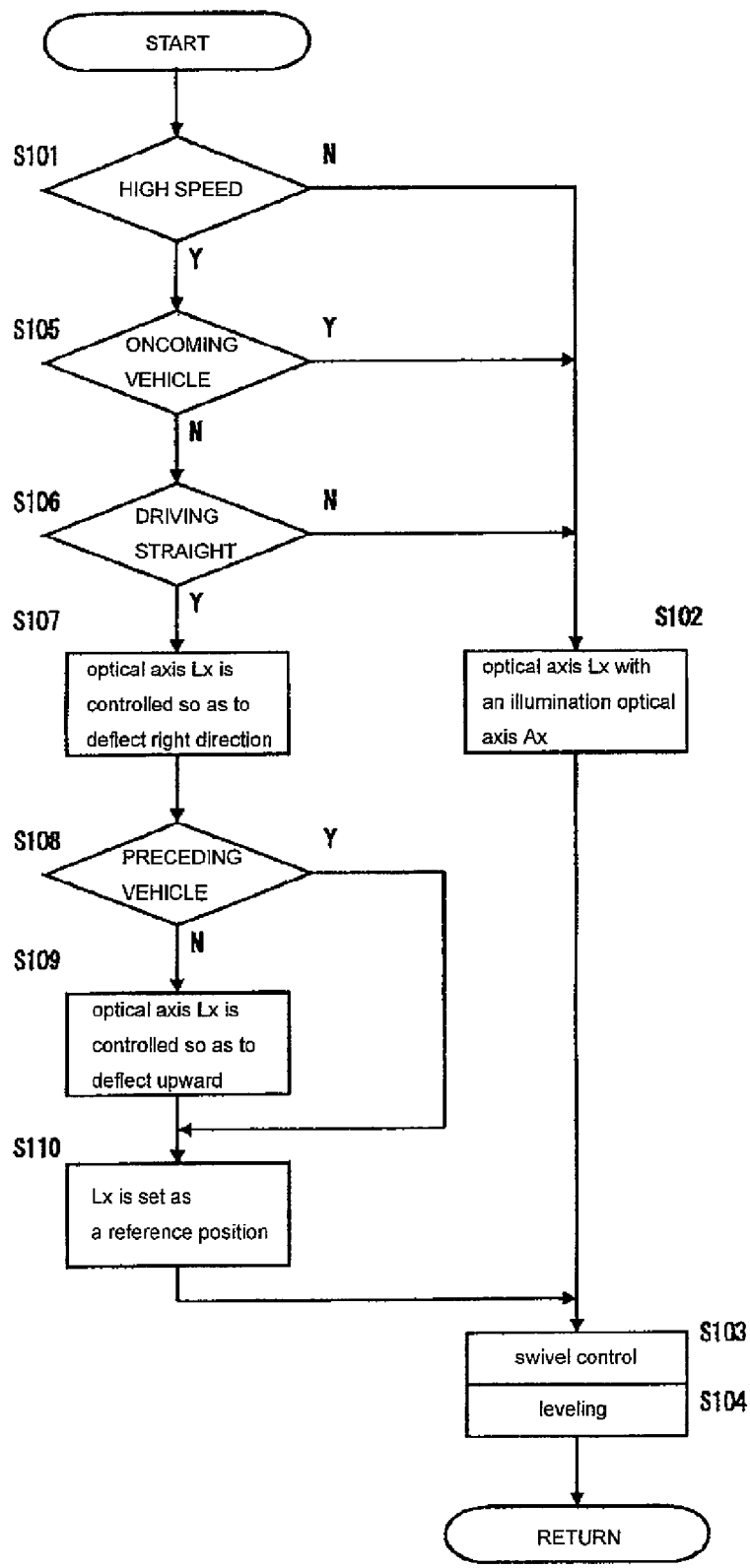
FIG. 3 is a flowchart explaining a control of an illumination direction according to an embodiment of the present invention.
Figure 4A:
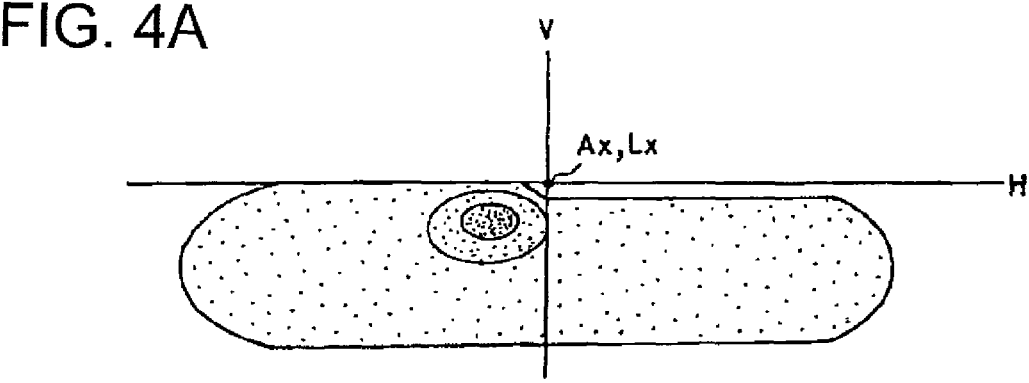
FIG. 4 shows diagrams of light distribution characteristics of a low-beam distribution pattern according to the first embodiment.
Figure 5C:
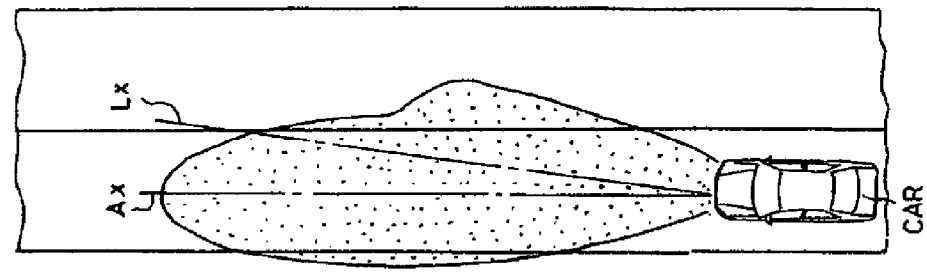
FIG. 5 shows views of illuminated areas of the low-beam distribution pattern according to the first embodiment.
Figure 5B:
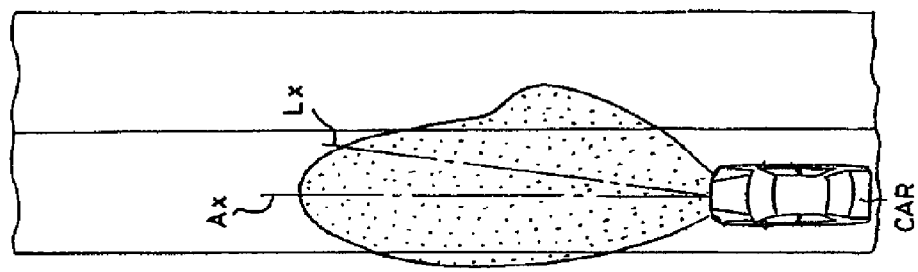
Figure 5A:
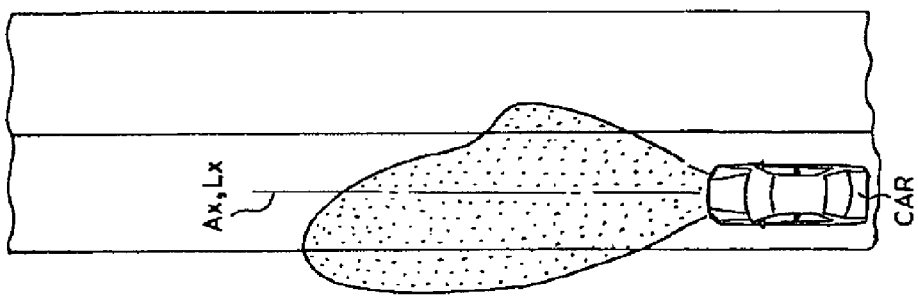

A light distribution control of a headlamp with the above structure will be explained below with reference to a flowchart in FIG. 3. FIG. 4(a) shows a light distribution characteristic of a low-beam distribution pattern obtained when the lamp unit 110 is lit, and FIG. 5(a) is a view showing a low-beam light distribution area. Based on the vehicle speed signal from the vehicle speed sensor 33, if the vehicle speed is not a high speed, namely, if a host vehicle CAR is driving normally at a mid to low speed (S101), then the ECU 21 orients the lamp unit optical axis Lx in a linear travel direction of the host vehicle CAR and coincides the lamp unit optical axis Lx with an illumination optical axis (with such an illumination optical axis oriented in the linear travel direction of the host vehicle) Ax, which is an intersection of a vertical line V and a horizontal line H of a light distribution characteristic (S102).

For the low-beam distribution pattern, a horizontal cut-off line is set at an angular position that is lower than the horizontal line H in an oncoming vehicle lane side (a right side in the figure) area, and a horizontal cut-off line that includes an oblique cut-off line is set at an angular position closer to the horizontal line H in a host vehicle lane to road shoulder side (a left side in the figure) area. Also, a maximum light intensity area of the low-beam distribution pattern as shown by an iso-intensity line in the figure is set to an angular position that is deflected more leftward than the vertical line V. Therefore, with this low-beam distribution pattern, an area on a side somewhat leftward of a direction of the illumination optical axis Ax, namely, a linear travel direction for a host vehicle lane in which the host vehicle is driving, is brightly illuminated, while dazzling of an oncoming vehicle present in an area on a side rightward of the illumination optical axis Ax is prevented. However, because the maximum light intensity area is deflected more leftward than the illumination optical axis Ax, there are times when the brightness is perceived as insufficient when the driving lane of the host vehicle CAR is brightly illuminated over a distance forward area.

Furthermore, during host vehicle travel, the ECU 21 controls the swivel drive circuit 22 based on the steering angle signal when the host vehicle is driving on a curved road, and performs a swivel control wherein the swivel drive mechanism 120 is driven to deflect the lamp unit optical axis Lx rightward and leftward so as to follow the steering direction of the host vehicle (S103). For example, when the host vehicle is detected as making a right turn based on the steering angle signal, the swivel mechanism 120 is driven to control the lamp unit optical axis Lx so as to deflect rightward at an angle that corresponds to the steering angle. Thus, the illumination area of the low-beam distribution pattern is oriented in the right direction of the host vehicle, and the steering direction of the host vehicle is illuminated. Similarly, for left turns, the swivel mechanism 120 is driven to control the lamp unit optical axis Lx so as to deflect leftward at an angle that correspond to the steering angle. Accordingly, it is possible to suitably illuminate a driving route when traveling on a curved road.

Meanwhile, if the ECU 21 detects the front portion of the host vehicle tilting upward or downward based on the vehicle height signal, then the ECU 21 controls the leveling drive circuit 23 and drives the leveling mechanism 130 so as to balance out such tilting (S104). Thus, the lamp unit optical axis Lx is controlled so as to deflect upward and downward, and the lamp unit optical axis Lx is maintained at a constant angle with respect to the road surface. The lamp unit optical axis Lx is controlled to a predetermined direction regardless of changes in the number of occupants in the host vehicle, changes in the amount of cargo on board, or the like.

In contrast to an ordinary light distribution control as described above, if the vehicle speed of the host vehicle is equal to or greater than a predetermined speed (S101), then based on the vehicle speed signal, the ECU 21 detects that the host vehicle is in a high-speed driving condition and switches to a high-speed driving mode. In the high-speed driving mode, the ECU 21 first detects an oncoming vehicle based on a detection signal from the vehicle detection device 34. If an oncoming vehicle is not detected (S105), then the ECU 21 determines whether the host vehicle is driving straight based on the steering angle signal (S106).

Figure 4B:
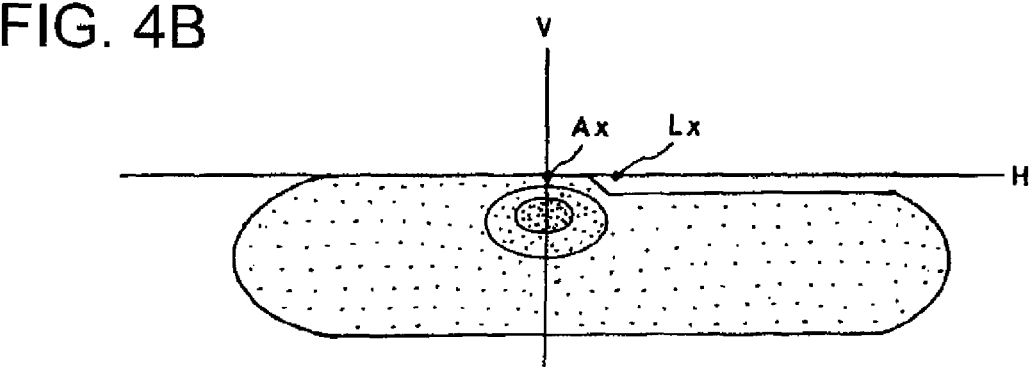

If the host vehicle is traveling straight and the lamp unit optical axis Lx is set to the illumination axis Ax, i.e., if the lamp unit optical axis Lx is oriented in a linear travel direction of the host vehicle, then the ECU 21 controls the swivel drive circuit 22 and controls the lamp unit optical axis Lx so as to deflect at a predetermined angle set in advance, such as approximately 1.5 to 3 degrees, from the illumination axis Ax toward an oncoming vehicle lane direction, namely, the right direction (S107). Thus, the low-beam distribution pattern and the distribution area are deflected rightward at a predetermined angle while the illumination area remains the same pattern as shown in FIGS. 4(b) and 5(b). In such case, the control is performed until the oblique cut-off line of the low-beam distribution pattern passes the vertical line V and enters the right-side area. Thus, the maximum light intensity area of the low-beam distribution pattern is set to an area near the illumination optical axis Ax. A forward linear travel area of the host vehicle lane is therefore brightly illuminated, making increased visibility possible. At such a time, the oblique cut-off line of the low-beam distribution pattern is deviated rightward, and the issue of dazzling an oncoming vehicle does not arise because there is no oncoming vehicle. In addition, even if there is a preceding vehicle driving ahead in the host vehicle lane, light is not illuminated upward of the horizontal line H in the host vehicle lane side so there is no illumination of a rearview mirror in the preceding vehicle. Thus, the preceding vehicle is not dazzled.

Note that at step S105, when the ECU 21 detects an oncoming vehicle, the deflection control of the lamp unit 110 during linear travel is not performed. Furthermore, when the lamp unit optical axis Lx is controlled so as to deflect rightward as described above in the high-speed driving mode, the lamp unit optical axis Lx is controlled so as to deflect leftward back to the illumination optical axis Ax when the presence of an oncoming vehicle has been confirmed (S102). Thus, dazzling of the oncoming vehicle can be prevented.

Figure 4C:
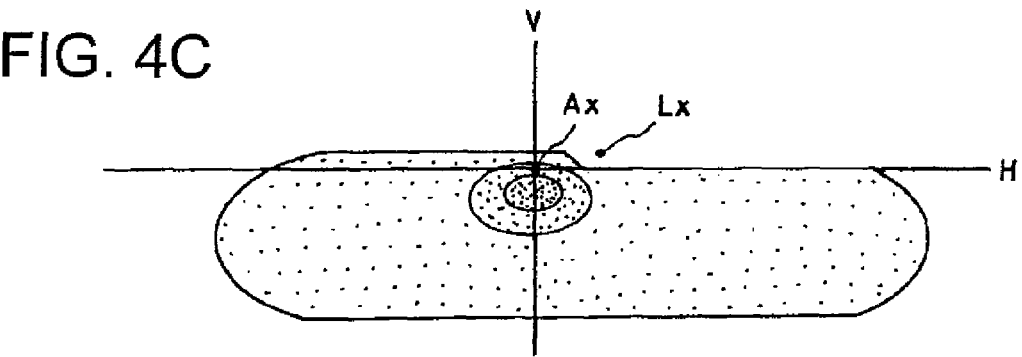

During the high-speed driving mode when the lamp unit optical axis Lx is controlled so as to deflect toward the oncoming vehicle side, the ECU 21 detects a preceding vehicle based on the detection signal from the vehicle detection device 34 (S108). If there is a preceding vehicle, then the lamp unit optical axis Lx is maintained unchanged, but if no preceding vehicle is detected, then the ECU 21 also drives the leveling drive circuit 23. Normally, the angle of the lamp unit optical axis Lx in the up-down direction is controlled such that a predetermined angle with respect to the road surface is achieved depending on the occupants in the host vehicle and the cargo on board. However, if there is no preceding vehicle, then the lamp unit optical axis Lx is controlled so as to deflect upward at a predetermined angle, such as approximately 0.1 to 2 degrees (S109). Thus, the low-beam distribution pattern and the light distribution area are such that the lamp unit optical axis Lx is oriented upward, and the horizontal cut-off line of the low-beam distribution pattern on the host vehicle lane side in an area leftward of the vertical line V is oriented somewhat upward of the horizontal line H, as shown in FIGS. 4(c) and 5(c). A forward distant area of the host vehicle lane is therefore brightly illuminated, making improved visibility of the host vehicle lane possible.

Even in the high-speed driving mode, if the ECU 21 determines that the host vehicle is turning right or left based on the steering angle signal, then the ECU 21 executes a swivel control that corresponds to the steering angle (S103). At such time, if no oncoming vehicle is detected, then the current lamp unit optical axis Lx already controlled to deflect rightward is set as a reference position (S110), and a subsequent right-left deflection control of the lamp unit optical axis Lx is performed centered on the reference position. Thus, even in cases of traveling on a curved road in the high-speed driving mode with no oncoming vehicles present, it is possible to brightly illuminate the steering direction. Meanwhile, if no preceding vehicle is detected either, then the current lamp unit optical axis Lx already controlled to deflect rightward and upward is set as the reference position (S110), and a subsequent right-left deflection control of the lamp unit optical axis Lx is performed centered on the reference position. Regarding an up-down control of the lamp unit optical axis Lx by the leveling drive circuit 23, a reference position therefor is also the newly set reference position.

Here, according to the first embodiment, manual operation of a high-speed driving mode switch 35 in a driver seat can stop a shift to the high-speed driving mode. If there are many oncoming and preceding vehicles, then the right-left deflection control and the up-down deflection control of the lamp unit optical axis Lx may be repeatedly performed each time the host vehicle passes an oncoming vehicle or overtakes a preceding vehicle. Such manual operation of the high-speed driving mode switch 35 is effective in cases where the driver feels annoyed by fluctuations in the illumination condition caused by the deflection control. On the other hand, the high-speed driving mode switch 35 can also be operated to immobilize the high-speed driving mode. At times when there are few oncoming and preceding vehicles but the vehicle speed frequently changes due to curved or hilly roads, switching between the high-speed driving mode and a different mode is frequently performed based on the vehicle speed signal. Immobilizing the high-speed driving mode switch 35 is thus effective for eliminating any annoyance due to fluctuations in the illumination condition caused by the right-left deflection control of the lamp unit optical axis Lx.

Second Embodiment

Figure 6:
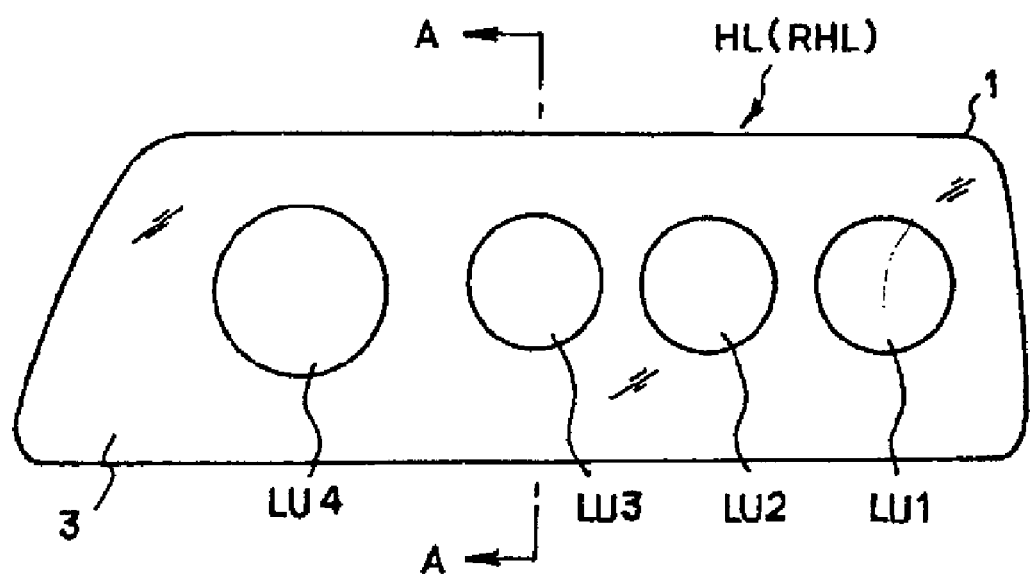
FIG. 6 is a frontal view of a schematic structure of a headlamp according to a second embodiment.
Figure 7:
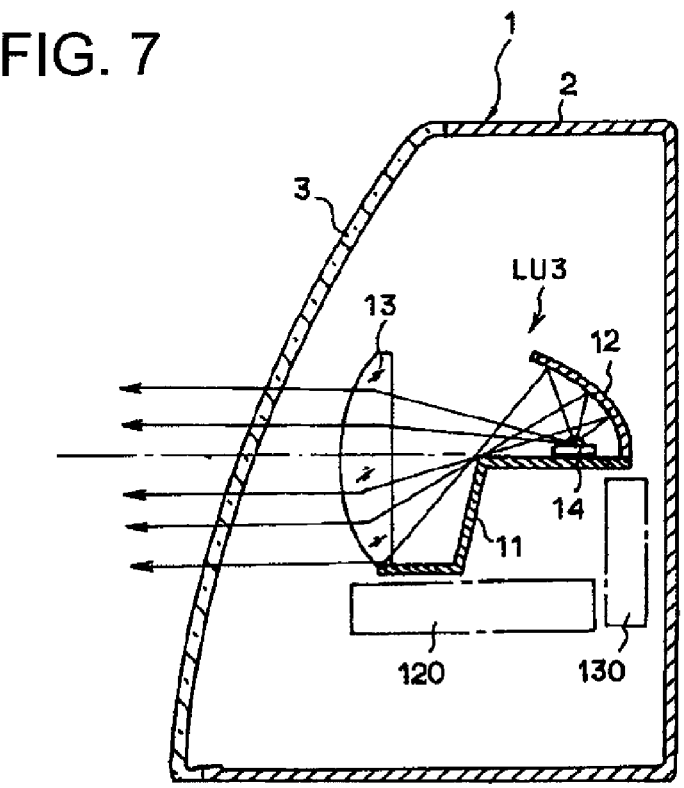
FIG. 7 is a schematic cross-sectional view taken along a line A-A in FIG. 6.

FIG. 6 is a frontal view showing a schematic structure of a headlamp according to a second embodiment. The second embodiment is applied to a headlamp HL structured from a plurality of lamp units that use a semiconductor light emitting element such as an LED as a light source. A lamp housing 1 of the headlamp RHL is structured from a lamp body 2 and a translucent front cover 3. Arranged within the lamp housing 1 are three lamp units, namely, first to third lamp units LU1, LU2, LU3, for forming a low-beam distribution pattern, and a fourth lamp unit LU4 for forming a high-beam distribution pattern. The three lamp units LU1, LU2, LU3 are all structured as light collecting lamps, but with different degrees of light collection. The first lamp unit LU1 is structured so as to emit light over a relatively wide area, the second lamp unit LU2 is structured so as collect and emit light over a narrower area, and the third lamp unit LU3 is structured so as to emit light in a concentrated manner in an even narrower required area. The fourth lamp unit LU4 is structured as a diffusion type lamp, such as a reflector type lamp, that emits light in an extremely wide range, but will not be described in further detail here. The lamp units LU1, LU2, LU3 have almost the same structure. Therefore, the third lamp LU3 will be shown as a representative example. FIG. 7 shows a cross-sectional view taken along a line A-A in FIG. 6. As the figure shows, a semi-rotational ellipsoid type reflector 12 is provided at a rear portion of a base body 11 mounted with an LED 14. A collecting lens 13 is disposed at a front portion of the base body 11. Light emitted by the LED 14 is reflected and collected by the reflector 12, and light diffused from a light converging point is collected by the collecting lens 13, whereby respective required light distribution patterns are obtained.

Figure 8A:
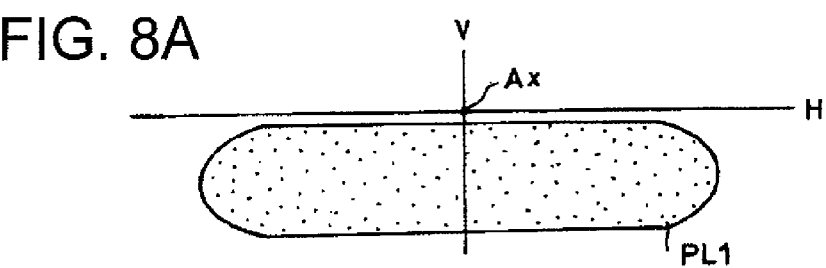
FIG. 8 shows diagrams of light distribution characteristics of lamp units according to the second embodiment.
Figure 8B:
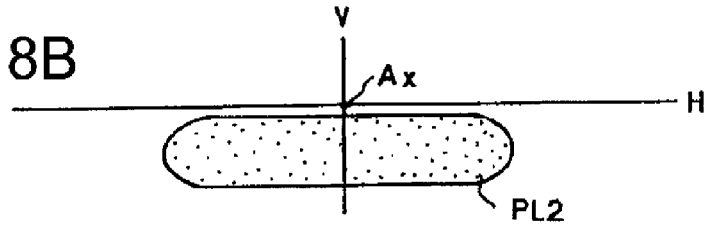
Figure 8C:
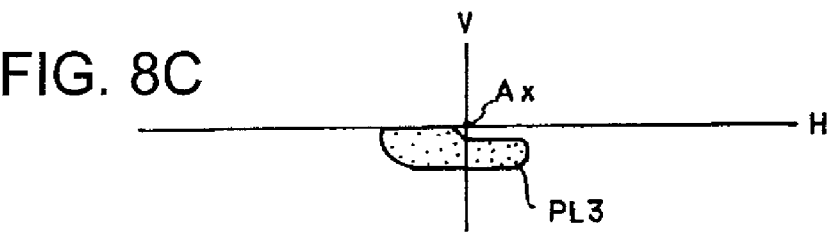
Figure 9A:
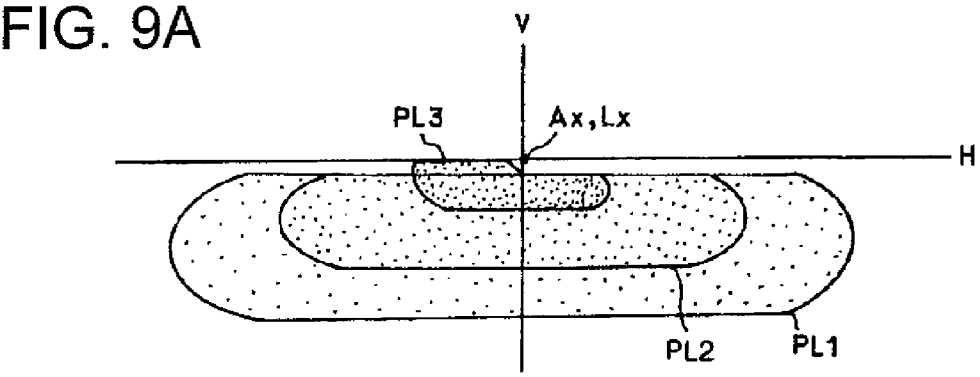
FIG. 9 shows diagrams of light distribution characteristics of a low-beam distribution pattern according to the second embodiment.

FIG. 8 shows views of the light distribution patterns of the three lamp units LU1, LU2, LU3, respectively, wherein FIG. 8(a) is a diagram of a light distribution characteristic of a light distribution pattern PL1 of the first lamp unit LU1, FIG. 8(b) is a diagram of a light distribution characteristic of a light distribution pattern PL2 of the second lamp unit LU2, and FIG. 8(c) is a diagram of a light distribution characteristic of a light distribution pattern PL3 of the third lamp unit LU3. Here, the light distribution pattern PL3 of the third lamp unit LU3 is oriented near an illumination optical axis Ax and a light intensity thereof is higher than that of the other lamp units. Also, a portion of the light distribution pattern PL3 is formed with an oblique cut-off line in the low-beam distribution pattern. Overlapping the light distribution patterns PL1, PL2, PL3 forms the low-beam distribution pattern shown in FIG. 9(a).

Regarding the third lamp unit LU3 forming the oblique cut-off line among the lamp units here, similar to the lamp unit in the first embodiment, a swivel mechanism 120 for controlling a lamp unit optical axis Lx so as to deflect rightward and leftward, and a leveling mechanism 130 for controlling the lamp unit optical axis Lx so as to deflect upward and downward are provided, as shown by two-dotted lines in FIG. 7. The structures of the swivel mechanism 120 and the leveling mechanism 130 are that same as the structures of the first embodiment so a detailed description will not be given here. A right-left deflection control and an up-down deflection control are performed by an ECU 21 identical to that shown in FIG. 1.

Figure 9B:
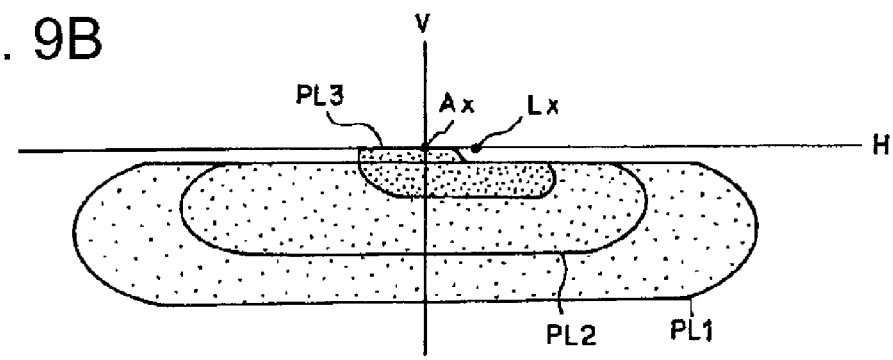

According to the second embodiment, at times when a vehicle speed of a host vehicle is equal to or faster than a predetermined vehicle speed and a high-speed driving mode is activated, and no oncoming vehicles are detected and the host vehicle is traveling straight, the ECU 21 controls only the third lamp unit LU3 so as to deflect rightward of an oncoming car lane side. Thus, only the light distribution pattern PL3 of the third lamp unit LU3 that forms the oblique cut-off line is deflected rightward, and as FIG. 9(b) shows, a low-beam distribution pattern obtained by overlapping the light distribution patterns of the first to third lamp units becomes a light distribution pattern where a high light intensity area is moved more rightward than a vertical line V. Accordingly, a maximum light intensity area of the low-beam distribution pattern exists within the light distribution pattern PL3 of the third lamp unit LU3, which has the highest light-collecting characteristic. Therefore, controlling the light distribution pattern PL3 so as to deflect rightward leads to an increased light intensity of an area near the illumination optical axis Ax of the host vehicle lane, similar to that shown in FIG. 5(b), and a forward area of the host vehicle lane is brightly illuminated. At such a time, the issue of dazzling an oncoming vehicle does not arise because there is no oncoming vehicle.

Figure 9C:
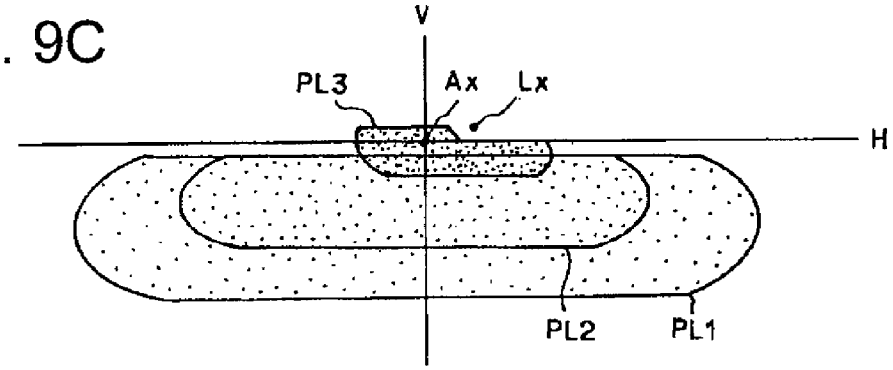

During linear travel when no oncoming vehicle is detected and the third lamp unit LU3 is controlled so as to deflect rightward, and also when no preceding vehicle is detected, only the third lamp unit LU3 is controlled so as to deflect upward. Thus, as FIG. 9(c) shows, a horizontal cut-off line on the host vehicle lane side of the low-beam distribution pattern is deflected upward to the level of a horizontal line H or a higher level. As a consequence, similar to that shown in FIG. 5(c), the maximum light intensity area of the light distribution pattern PL3 of the third lamp unit LU3 brightly illuminates up to a distant forward area of the host vehicle lane for improved visibility of the host vehicle lane. At such a time, the issue of dazzling a preceding vehicle does not arise because there is no preceding vehicle.

In the second embodiment as well, manual operation of a high-speed driving mode switch 35 in a driver seat can stop a shift to the high-speed driving mode or immobilize the high-speed driving mode. Thus, frequent fluctuations of a light distribution pattern can be prevented, and a possible source of annoyance for the driver can also be prevented.

In the first and second embodiments, the illumination direction is deflected rightward and then deflected upward. However, in cases where only preceding vehicles are absent, a structure may be used in which the illumination direction is deflected upward without being deflected rightward. Although description was omitted for the first and second embodiments, there is a lamp unit for forming a high-beam distribution pattern in the lamp housing of the headlamp. This lamp unit may be structured as a lamp unit that uses any one of an incandescent bulb, a discharge lamp, or a semiconductor light emitting element as a light source.

In addition, if embodiments of the present invention are applied for a low-beam distribution pattern, the low-beam distribution pattern is not limited to the light distribution patterns of the first and second embodiments. Indeed, embodiments of the present invention can be applied to any low-beam distribution pattern, provided that a maximum light intensity area, namely, an illuminated area extending into the distance, of a light distribution pattern during linear travel of a host vehicle is oriented more toward a road shoulder side than a linear travel direction.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

HL, RHL HEADLAMP
LU1 to LU4 LAMP UNIT
PL1 to PL3 LIGHT DISTRIBUTION PATTERN
Lx LAMP UNIT OPTICAL AXIS
H HORIZONTAL LINE
V VERTICAL LINE
Ax ILLUMINATION OPTICAL AXIS
1 LAMP HOUSING
21 ECU
22 SWIVEL DRIVE CIRCUIT
23 LEVELING DRIVE CIRCUIT
31 STEERING ANGLE SENSOR
32 VEHICLE HEIGHT SENSOR
33 VEHICLE SPEED SENSOR
34 VEHICLE DETECTION DEVICE
35 HIGH-SPEED MODE SWITCH
100 LAMP HOUSING
110 LAMP UNIT
120 SWIVEL MECHANISM
130 LEVELING MECHANISM

What is claimed is:

1. A vehicular headlamp capable of illumination according to a light distribution pattern that does not dazzle an oncoming vehicle and capable of changing an illumination direction, the vehicular headlamp comprising:

a swivel mechanism capable of changing the illumination direction horizontally rightward and leftward;

a leveling mechanism capable of changing the illumination direction vertically upward and downward;

illumination direction control means for controlling the swivel mechanism and leveling mechanism to change the illumination direction toward an oncoming vehicle lane side during linear travel of a vehicle; and oncoming vehicle detection means capable of detecting an oncoming vehicle, wherein the illumination direction control means performs the illumination direction change control when the oncoming vehicle detection means does not detect an oncoming vehicle.

2. A vehicular headlamp capable of illumination according to a light distribution pattern that does not dazzle an oncoming vehicle and capable of changing an illumination direction, the vehicular headlamp comprising:

a swivel mechanism capable of changing the illumination direction horizontally rightward and leftward;

a leveling mechanism capable of changing the illumination direction vertically upward and downward;

illumination direction control means for controlling the swivel mechanism and leveling mechanism to change the illumination direction toward an oncoming vehicle lane side during linear travel of a vehicle; and preceding vehicle detection means capable of detecting a preceding vehicle, wherein the illumination direction control means controls the leveling mechanism to change the illumination direction so as to deflect upward when the preceding vehicle detection means does not detect a preceding vehicle.

3. The vehicular headlamp according to claim 1, wherein the illumination direction control means controls the swivel mechanism such that, using an illumination direction during linear travel as a reference, the illumination direction is deflected rightward and leftward so as to follow a steering angle of a vehicle.

4. The vehicular headlamp according to claim 1, further comprising:

preceding vehicle detection means capable of detecting a preceding vehicle, wherein the illumination direction control means controls the leveling mechanism to change the illumination direction so as to deflect upward when the preceding vehicle detection means does not detect a preceding vehicle.

5. The vehicular headlamp according to claim 4, wherein the illumination direction control means controls the swivel mechanism such that, using an illumination direction during linear travel as a reference, the illumination direction is deflected rightward and leftward so as to follow a steering angle of a vehicle, and wherein, when no oncoming vehicle or preceding vehicle is detected, the illumination direction deflected by the illumination direction control means is set as the reference for linear travel.

6. A vehicular headlamp comprising:

a light source for illuminating light from the vehicular headlamp in an illumination direction;

a swivel mechanism capable of changing the illumination direction horizontally rightward and leftward;

a leveling mechanism capable of changing the illumination direction vertically upward and downward;

electronic control unit capable of controlling the swivel mechanism and the leveling mechanism so as to change the illumination direction toward an oncoming vehicle lane side during linear travel of a vehicle; and vehicle detection device capable of detecting an oncoming vehicle, wherein the electronic control unit performs the illumination direction change control when the vehicle detection device does not detect an oncoming vehicle.

7. A vehicular headlamp comprising:

a light source for illuminating light from the vehicular headlamp in an illumination direction;

a swivel mechanism capable of changing the illumination direction horizontally rightward and leftward;

a leveling mechanism capable of changing the illumination direction vertically upward and downward;

electronic control unit capable of controlling the swivel mechanism and the leveling mechanism so as to change the illumination direction toward an oncoming vehicle lane side during linear travel of a vehicle; and vehicle detection device capable of detecting a preceding vehicle, wherein the electronic control unit controls the leveling mechanism to change the illumination direction so as to deflect upward when the vehicle detection device does not detect a preceding vehicle.

8. The vehicular headlamp according to claim 6, further comprising:

a steering angle sensor that detects a vehicle steering angle;

wherein the electronic control unit controls the swivel mechanism such that, using an illumination direction during linear travel as a reference, the illumination direction is deflected rightward and leftward so as to follow the vehicle steering angle.

9. The vehicular headlamp according to claim 6, wherein the vehicle detection device is capable of detecting a preceding vehicle, and wherein the electronic control unit controls the leveling mechanism to change the illumination direction so as to deflect upward when the vehicle detection device does not detect a preceding vehicle.

10. The vehicular headlamp according to claim 9, further comprising:

a steering angle sensor that detects a vehicle steering angle;

wherein the electronic control unit controls the swivel mechanism such that, using an illumination direction during linear travel as a reference, the illumination direction is deflected rightward and leftward so as to follow the vehicle steering angle, and wherein, when no oncoming vehicle or preceding vehicle is detected, the illumination direction deflected by the electronic control unit is set as the reference for linear travel.

11. The vehicular headlamp according to claim 6, further comprising:

a vehicle speed sensor for detecting a vehicle speed, wherein electronic control unit controls the swivel mechanism and leveling mechanism to change the illumination direction only if the detected vehicle speed is above a predetermined value.

12. The vehicular headlamp according to claim 2, wherein the illumination direction control means controls the swivel mechanism such that, using an illumination direction during linear travel as a reference, the illumination direction is deflected rightward and leftward so as to follow a steering angle of a vehicle.

13. The vehicular headlamp according to claim 7, further comprising:

a steering angle sensor that detects a vehicle steering angle;

wherein the electronic control unit controls the swivel mechanism such that, using an illumination direction during linear travel as a reference, the illumination direction is deflected rightward and leftward so as to follow the vehicle steering angle.

14. The vehicular headlamp according to claim 7, further comprising:

a vehicle speed sensor for detecting a vehicle speed, wherein electronic control unit controls the swivel mechanism and leveling mechanism to change the illumination direction only if the detected vehicle speed is above a predetermined value.

* * * * *